United States Patent [19]

Winter

[11] Patent Number: 5,781,953
[45] Date of Patent: Jul. 21, 1998

[54] DOCK LEVELER RAMP

[75] Inventor: Bruce R. Winter, Muskego, Wis.

[73] Assignee: Overhead Door Corporation, Dallas, Tex.

[21] Appl. No.: 681,039

[22] Filed: Jul. 22, 1996

[51] Int. Cl.$^6$ .................... B65G 69/28; E01D 15/00
[52] U.S. Cl. .................. 14/69.5; 14/71.1; 14/73; 14/77.1; 52/693
[58] Field of Search ................ 14/3, 4, 6, 7, 13, 14/14, 15, 71.3, 71.1, 73, 77.1; 52/650.2, 650.3, 651.06, 693, 692

[56] References Cited

U.S. PATENT DOCUMENTS

| | | | |
|---|---|---|---|
| 3,175,653 | 3/1965 | Law | 14/6 |
| 3,184,773 | 5/1965 | Breneman | 14/69.5 |
| 3,253,288 | 5/1966 | Nagin | 14/73 |
| 3,882,563 | 5/1975 | Smith et al. | 14/71 |
| 3,902,213 | 9/1975 | Pfleger et al. | 14/71.3 |
| 3,921,241 | 11/1975 | Smith | 14/71 |
| 4,068,338 | 1/1978 | Artzberger | 14/71.3 |
| 4,333,293 | 6/1982 | Jackson | 52/693 X |
| 4,450,598 | 5/1984 | Larsen | 14/71.1 |
| 4,541,218 | 9/1985 | Gottlieb | 52/693 X |
| 4,570,277 | 2/1986 | Hahn et al. | 14/71.1 X |
| 4,619,008 | 10/1986 | Kovach et al. | 14/71.1 X |
| 4,662,021 | 5/1987 | Hagen et al. | 14/71.3 |
| 4,776,534 | 10/1988 | Bamford | 14/3 X |
| 4,928,340 | 5/1990 | Alexander | 14/71.3 |
| 5,097,557 | 3/1992 | Salman et al. | 14/71.1 |
| 5,123,135 | 6/1992 | Cook et al. | 14/71.3 |
| 5,311,628 | 5/1994 | Springer et al. | 14/71.3 X |
| 5,586,355 | 12/1996 | Metz et al. | 14/71.3 X |
| 5,592,800 | 1/1997 | Koo et al. | 52/693 X |
| 5,651,154 | 7/1997 | Ahlskog et al. | 14/6 |

FOREIGN PATENT DOCUMENTS

WO 93/13267   7/1993   WIPO ................. 14/69.5

*Primary Examiner*—James Lisehora
*Attorney, Agent, or Firm*—Akin, Gump, Strauss, Hauer & Feld, L.L.P.

[57] ABSTRACT

A loading dock leveler adapted for being supported for pivotal movement on a loading dock to provide a pathway between the dock and a vehicle being loaded or unloaded includes a ramp formed of a generally flat plate deck member having a plurality of spaced apart, parallel, channel cross section beams welded to the underside of the deck member and extending between a distal side edge of the deck member and a side edge which is disposed adjacent the loading dock. Plural spaced apart pairs of hinge members are welded to the deck member and to the beams at the distal side edge of the deck member and a truss structure including somewhat V-shaped struts extend between the hinge members and are welded to the hinge members and the deck member to provide a lightweight, rigid and durable support structure for minimizing deflection of the deck member and failure of a hinge connection between the ramp and a dock leveler lip member. The lip member has spaced apart pairs of hinge members which may have tapered beam portions welded to the lip member and gussets or a reinforcing plate extending between and welded to the hinge members of each pair.

30 Claims, 4 Drawing Sheets

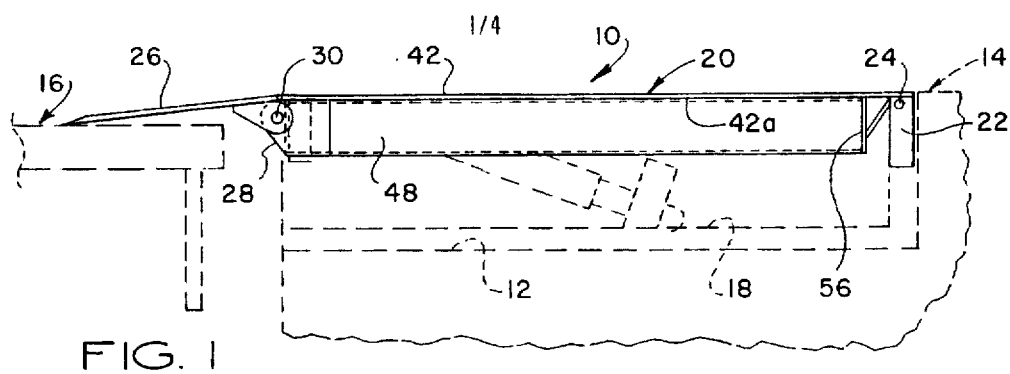
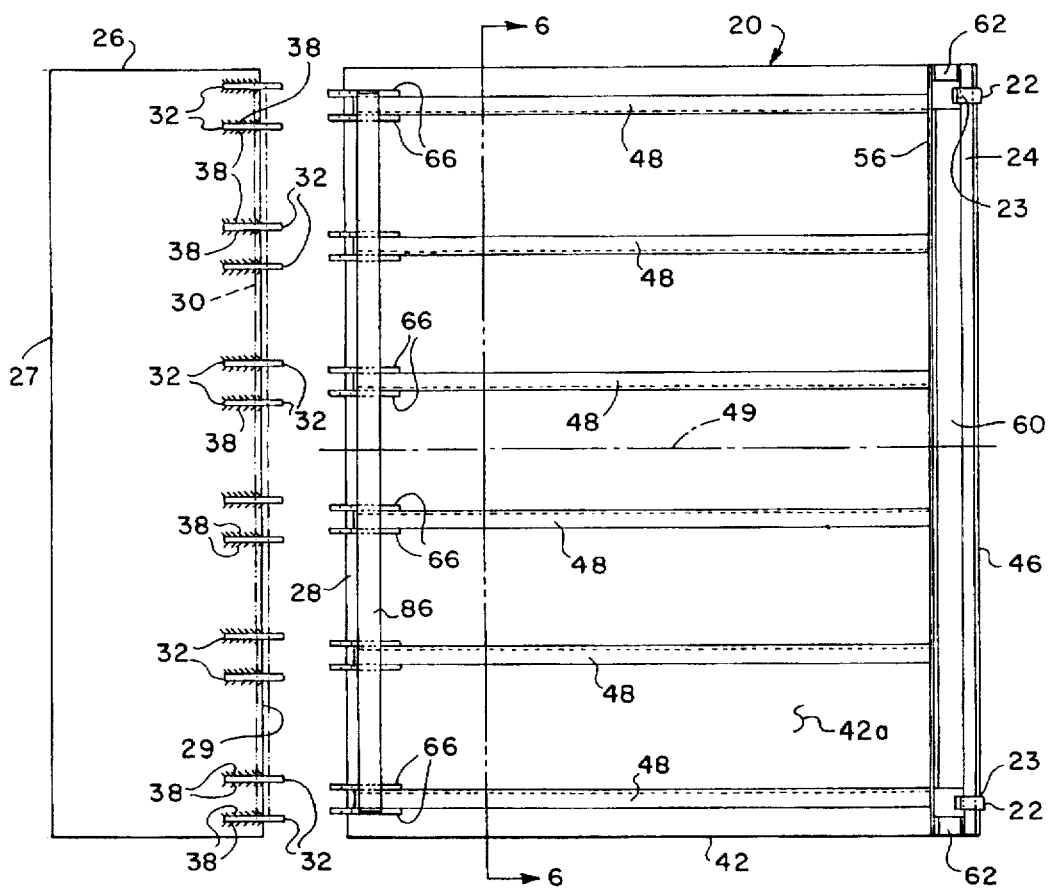
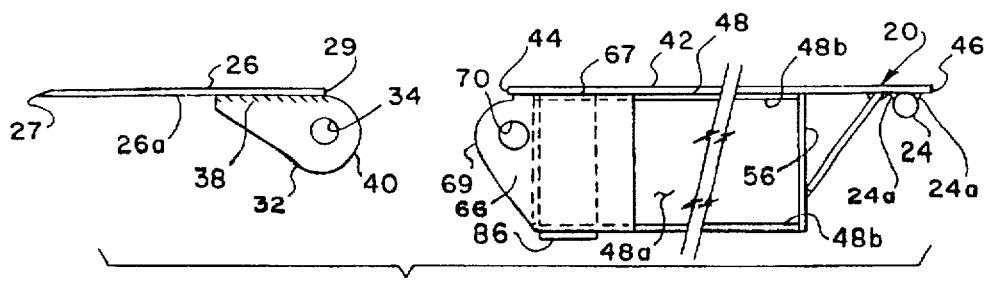

DOCK LEVELER RAMP

FIELD OF THE INVENTION

The present invention pertains to a loading dock leveler ramp including a truss structure across the front or distal end of the ramp to which is attached a hinged lip member.

BACKGROUND

Loading dock leveler apparatus are well known of the general type which comprise a ramp which is hinged to a loading dock for movement about a generally horizontal pivot axis to accommodate variations in the height of vehicles parked at the dock and which are loaded or unloaded by traversing loads over the ramp. These devices typically include a so-called lip member hinged to the distal end of the ramp to contact the load floor of a vehicle being loaded or unloaded and to provide a continuous path for lift trucks and other devices used in loading or unloading the vehicle. Dockboards or dock levelers of the general type to which the present invention pertains are disclosed in U.S. Pat. No. 3,882,563 to Smith et al; 3,921,241 to Smith; 4,126,909 to Smith et al and 4,279,050 to Abbott, all assigned to the assignee of the present invention and U.S. Pat. No. 4,068,338 to Artzberger.

A longstanding problem in the art of dock levelers or dockboards pertains to the durability of the ramp, the lip member and the hinge connection between the ramp and the lip member. Dock leveler mechanisms are subject to extreme concentrated forces acting on the ramp deck member and its support structure as well as the lip member and the hinge connection between the deck member and the lip member. The repeated traversal of heavy loading vehicles over the leveler ramp during loading and unloading operations can cause early failure of the deck and its support structure, particularly in the area of the hinge connection between the ramp deck and the lip member. Although some efforts have been made to improve the structural features of dock leveler ramps and the hinge connection between the ramp deck and the lip member, such as described in the Artzberger patent, consideration must be given to providing a durable structure while minimizing the weight and cost of manufacture of the ramp and lip member without sacrificing strength and reliability. The present invention is directed to improvements in loading dock levelers, particularly a dock leveler ramp and extension lip structure, to overcome the above-mentioned problems.

SUMMERY OF THE INVENTION

The present invention provides an improved loading dock leveler apparatus including, in particular, an improved ramp construction. The present invention also provides a loading dock leveler ramp having an improved hinge connection between the ramp and a lip member connected to the ramp.

In accordance with one aspect of the invention a loading dock leveler ramp is characterized by a deck plate having a plurality of elongated spaced apart beams secured thereto, such as by welding, and extending generally between a connection point of the ramp with a loading dock and a distal end of the ramp, and wherein the ramp distal end is reinforced by a unique truss structure which adds substantial rigidity to the ramp deck member and provides for an improved hinge connection between the ramp and a lip member.

In accordance with another aspect of the present invention a dock leveler ramp construction is provided wherein a plurality of elongated conventional folded plate or otherwise formed channel cross section beams are disposed in supportive relationship to the ramp deck and are connected, respectively, at their ends disposed adjacent the distal end of the deck to spaced apart hinge plates, each of the hinge plates having a suitable hinge pin receiving bore formed therein. The ramp hinge plates are spaced apart in pairs and are cooperative with corresponding pairs of hinge plates supported on a lip member so that the lip member may be secured to the distal end of the ramp by an elongated rod-like hinge pin and wherein a high strength, durable hinge connection is provided between the ramp deck and the lip member. A series of truss members or struts are disposed between respective hinge plates of adjacent pairs of hinge plates on the ramp and are secured to the ramp deck member to provide a high strength and substantially rigid header for the ramp at its distal end. Hinge plates attached to the ramp and to the lip member, respectively, are configured to provide improved strength, rigidity and useful life of the ramp and the connection between the ramp and the lip member.

The present invention also provides an improved lip member for a dock leveler having a lightweight two-part construction.

The present invention still further provides a unique dock leveler ramp which is relatively easy to manufacture by an improved method of the present invention for assembling the ramp, and its associated parts, and while providing a ramp of desirable strength and durability and including a lip member hinge connection, also of desired strength and durability.

Those skilled in the art will further appreciate the advantages and superior features of the invention upon reading the detailed description which follows in conjunction with the drawings.

BRIEF DESCRIPTION OF THE DRAWINGS

FIG. 1 is a side elevation of a loading dock leveler apparatus having an improved ramp construction in accordance with the present invention;

FIG. 2 is a bottom plan view of the dock leveler lip member;

FIG. 3 is a bottom plan view of the dock leveler ramp;

FIG. 4 is a detail side elevation of the lip and ramp members, respectively;

DESCRIPTION OF THE PREFERRED EMBODIMENTS

Figure 5:
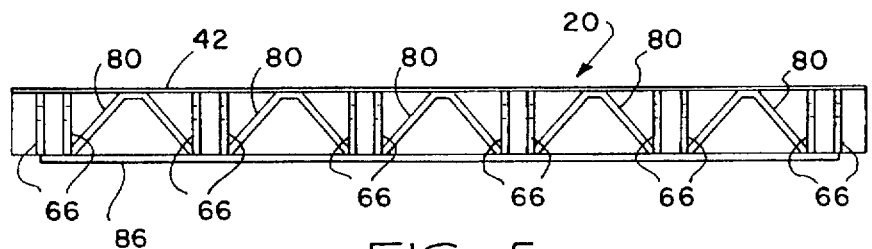
FIG. 5 is a front elevation of the ramp showing the truss structure.

In the description which follows like parts are marked throughout the specification and drawing with the same reference numerals, respectively. The drawing figures are not necessarily to scale in the interest of clarity and conciseness.

Referring to FIG. 1, there is illustrated a dock leveler apparatus, generally designated by the numeral 10, which includes a ramp in accordance with the invention. The dock leveler 10 is shown supported in a generally rectangular pit 12 of a loading dock 14 of conventional construction and adjacent which is positioned a loadbed 16 of a conventional motor vehicle, such as an over-the-road truck. The dock leveler 10 includes a suitable support frame 18 for supporting a ramp 20 in accordance with the invention which is pivotally connected to the frame 18 by respective spaced apart support members 22, one shown in FIG. 1, which journal a rodlike pivot pin 24 secured to the ramp. Mechanism associated with the ramp 20 for supporting same to move about a pivot axis formed by the pivot pin 24 is not shown in detail in FIG. 1, but may be a type described in the Smith or Smith et al patents mentioned hereinabove. Other types of ramp actuating mechanisms may be utilized.

Referring further to FIG. 1, the dock leveler 10 also includes a lip member 26 comprising a generally flat rectangular shaped plate which is supported on and hinged to the forward distal end 28 of the ramp 20 by an improved hinge connection which will be described in further detail herein. The lip member 26 is adapted to be pivotally connected to the distal end 28 of the ramp 20 for pivotal movement about a pivot axis defined by an elongated generally cylindrical rod-like hinge pin 30. Suitable mechanism, not shown, may be provided for moving the lip member 26 with respect to the ramp 20, as described in the above mentioned patents, for example. However, since such mechanism forms no part of the present invention it will not be described in detail herein.

Referring now to FIGS. 2, 3 and 4, the lip member 26, FIG. 2, is of generally rectangular configuration having a forward distal edge 27 and a parallel rear edge 29 coextensive with the edge 27, as defined by the generally rectangular shape of the lip member. The lip member 26 may be formed of conventional structural steel plate and has secured thereto plural spaced apart pairs of hinge members, each designated by the numeral 32. As shown in FIG. 4, each of the hinge members 32 comprises a plate with a pin receiving bore 34 formed therein for receiving the hinge pin 30. The hinge members 32 also include a longitudinal side edge 36 contiguous with the planar underside 26a of the lip member 26 and suitably secured thereto, such as by welding at 38, for example, on both sides of the edge 36. The hinge member 32 includes an arcuate portion 40 which projects rearwardly of the rear edge 29 of the lip member 26.

Figure 6:
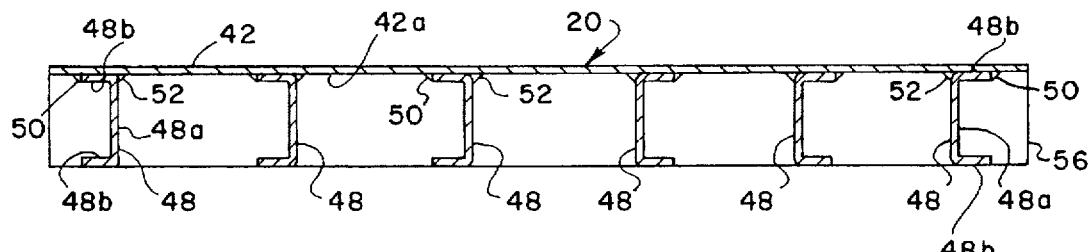
FIG. 6 is a section view taken generally from the line 6—6 of FIG. 3.

Referring now to FIGS. 3 and 4, the ramp 20 is characterized by a generally rectangular flat or planar deck member 42 having opposed, parallel, longitudinal side edges 44 and 46, the side edge 46 being adjacent to the pivot pin 24 and the side edge 44 being at the distal end 28 of the ramp. The deck member 42 may also be formed of structural steel plate. Referring further to FIGS. 3 and 4, and also FIG. 6, the ramp 20 is further characterized by a plurality of substantially equally spaced apart beams 48 extending between the side edges 44 and 46 and suitably secured to the deck member 42, such as by welding, as will be explained in further detail herein. Each of the beams 48 is preferably formed as a somewhat "C" shaped or channel shaped member having a web portion 48a, see FIG. 6, and opposed generally parallel transverse flanges 48b. Other beam cross sections may be used. As shown in FIG. 6, the beams 48 are provided for reinforcing the deck member 42 and three of the beams face in one direction while three of the beams on the opposite side of a central axis 49, FIG. 3, of the ramp 20 face in the opposite direction. The beams 48 are preferably secured to the deck member 42 by welding along welds 50 and 52, for example, FIG. 6, which welds are preferably coextensive with the flanges 48b which are contiguous with the deck member 42.

Referring still further to FIGS. 3, 4 and 6, the ramp 20 also includes a deck reinforcing and support member comprising an elongated, generally flat plate 56, substantially coextensive with the length of the deck member 42 and disposed in abutting relationship to ends of the beams 48 which are adjacent the side edge 46. The support plate 56 is also suitably secured to the deck member 42 by welding thereto at the contiguous surfaces and the support plate 56 is also preferably welded to the ends of the beams 48, again at their contiguous surfaces. As will be noted viewing FIGS. 3 and 4, the support plate 56 is spaced from the side edge 46 and the pivot pin or rod 24, allowing some overhang of the deck member 42 between the plate 56 and the side edge 46. This portion of the deck member 42 is reinforced by the hinge rod 24 which is welded to the deck member at suitable welds 24a, FIG. 4, for example. Further reinforcement of the deck member 42 is provided by a gusset plate 60 which extends between and is welded to the deck member and to the support plate 56 at respective contiguous surfaces. The gusset plate 60 extends between the opposed outboard beams 48, see FIG. 3, and adjacent, relatively short gusset plates 62 are also provided extending between the deck member 42 and the plate 56 while leaving clearance for members 22.

Figure 7:
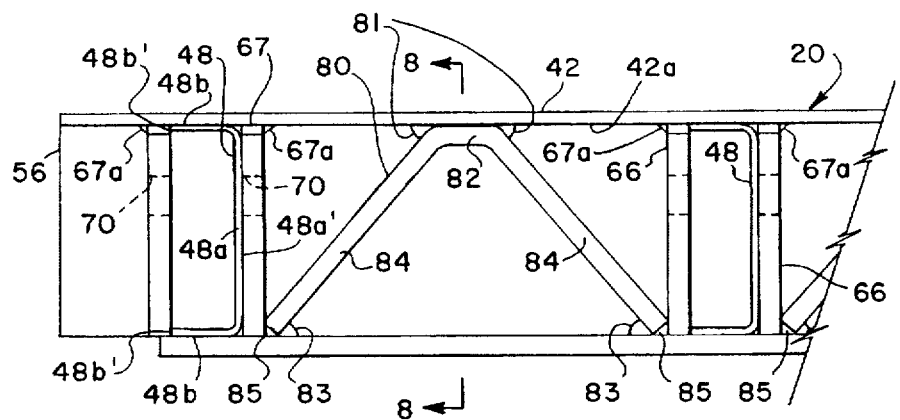
FIG. 7 is a detail elevation on a larger scale of the truss structure for the ramp and taken from the same viewpoint as FIG. 5.

Referring further to FIGS. 3, 4 and 5, the distal end 28 of the ramp 20 is provided with cooperating pairs of hinge members 66 which are secured to the deck member 42 and to the ends of the beams 48, generally as shown. FIG. 7 also illustrates that a hinge member 66 of each pair is contiguous with the deck member 42 and with the longitudinal edges 48b' of the beam flanges 48b. The other hinge member 66 of a pair is also contiguous with deck member 42 and with the outside surface 48a' of the web 48a of a beam 48. As shown in FIG. 4, each hinge member 66 has a longitudinal straight upper side edge 67, a generally parallel bottom side edge 68 and an arcuate portion 69 projecting outward from the edge 44 of the deck member 42. The longitudinal side edge 67 is contiguous with the deck member 42 and may be suitably welded thereto at least at welds 67a, for example, see FIG. 7. The hinge members 66 may also be welded to the beams 48 at their respective contiguous surfaces, including, for example, welds along edges 48b', FIG. 7, and welds along the junctures of flanges 48b with web 48a. Each hinge member 66 also includes a cylindrical bore 70 for receiving the aforementioned hinge pin 30. Those skilled in the art will appreciate that the hinge members 32 of each pair of hinge members on the lip member 26 are spaced apart just slightly greater than the spacing between the hinge members 66 of a pair of same so that the hinge members 32 may be positioned adjacent to and outboard of each pair of each hinge members 66 when the lip member 26 is assembled to the ramp 20.

Figure 8:
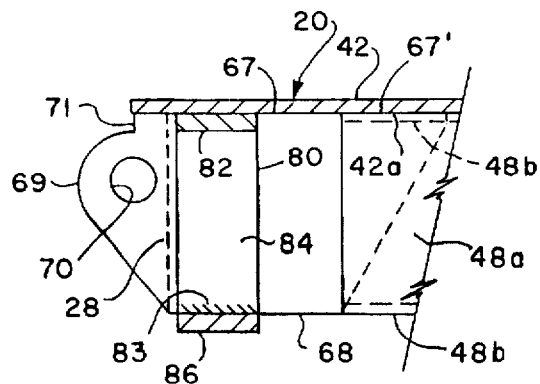
FIG. 8 is a detail section view taken from the line 8—8 of FIG. 7.

Referring briefly to FIG. 8, it will be noted that the arcuate portion 69 of each hinge member 66 intersects a surface 71 extending between the arcuate portion 69 and the edge 67 of the hinge member to provide clearance for movement of the side edge 29 of the lip member 26 into the position, generally as shown in FIG. 1. This position of the lip member 26 is one wherein the edge 29 bears against the side edge 44 of deck member 42. FIG. 8 also shows a modification to the hinge member 66 wherein the upper side edge 67 may be extended rearwardly with respect to the arcuate portion 69 a distance greater than the bottom side edge 68. The additional length of the upper side edge 67 is indicated at 67'. This additional length of the upper side edge of the hinge member 66, which is welded to the deck 48, may provide additional strength and rigidity of the ramp 20.

Referring now primarily to FIGS. 5, 7 and 8, the ramp 20 is provided with a unique truss structure extending along the distal end 28 of the ramp and characterized by plural, spaced apart, inverted V-shaped strut members 80. Each of the strut members 80 has a base portion 82, see FIG. 7, and opposed depending legs 84 of substantially equal length and equal angularity with respect to the base portion 82. The legs 84 terminate at a juncture between the hinge members 66 and an elongated truss plate member 86 which extends between the two outermost hinge members 66, as shown in FIGS. 3 and 5. As shown in FIG. 5, a strut member 80 extends between hinge members 66 of each adjacent pair of hinge members.

As shown in FIG. 7, the base 82 of each strut member 80 may be secured to the deck member 42 by welds 81, for example, and the legs 84 secured to the truss member 86 and hinge members 66 by welds 83 and 85, for example. These welds are coextensive with the width of the truss member 80, as shown by way of example for a weld 83 in FIG. 8.

By providing a truss arrangement as described above and shown in drawing FIGS. 5, 7 and 8, in particular, an improved hinge construction utilizing the hinge members 66 may be provided at the distal end of 28 of the ramp 20 while the rigidity of the ramp 20 at the distal end 28 is substantially enhanced. Minimizing deflection of the deck member 42 reduces bending stresses imposed on the hinge pin 30 and the associated hinge members 32 and 66. The width of the strut members 80 may be less than the length of the hinge members 66, as indicated in FIG. 8, although additional strength and rigidity of the deck member 42 may be provided, if desired, by increasing the width of the strut members. Moreover, multiple strut members may be disposed between the beams 48 spaced apart between the side edges 44 and 46 of the deck member 42, also, if desired. However, the strut members 80 at the distal end 28, together with the beams 48, provide improved strength and durability of the ramp 20.

Assembly of the ramp 20 is preferably carried out by placing the deck member 42 on a surface in a generally inverted position, with deck member surface 42a facing up, and welding the beams 48 to the deck member 42 in their predetermined positions, shown in FIG. 3. The hinge members 66 are then welded to the beams 48 and to the deck member 42 in the positions shown in the drawing figures, followed by welding the struts 80 in their respective positions between hinge members 66 of adjacent pairs of hinge members. The support plate 56 is preferably welded to the deck member 42 and to the ends of the beams 48 at any time after the beams 48 are welded in place, followed by welding the gusset plates 60 and 62 in their respective positions. The hinge rod 24 is welded in its working position extending across spaced apart recesses 23 in the deck member 42 and with the members 22 sleeved over the hinge rod and disposed in the respective recesses. After welding the struts 80 in position, the truss member 86 may be welded in place in the position shown in the drawing figures.

Figure 9:
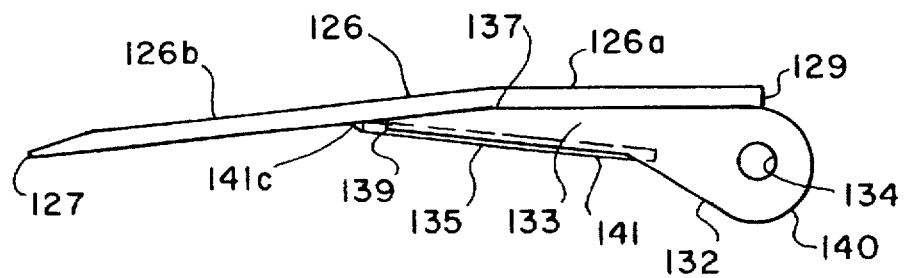
FIG. 9 is a detail side elevation of a modified lip member and hinge member therefor.
Figure 10:
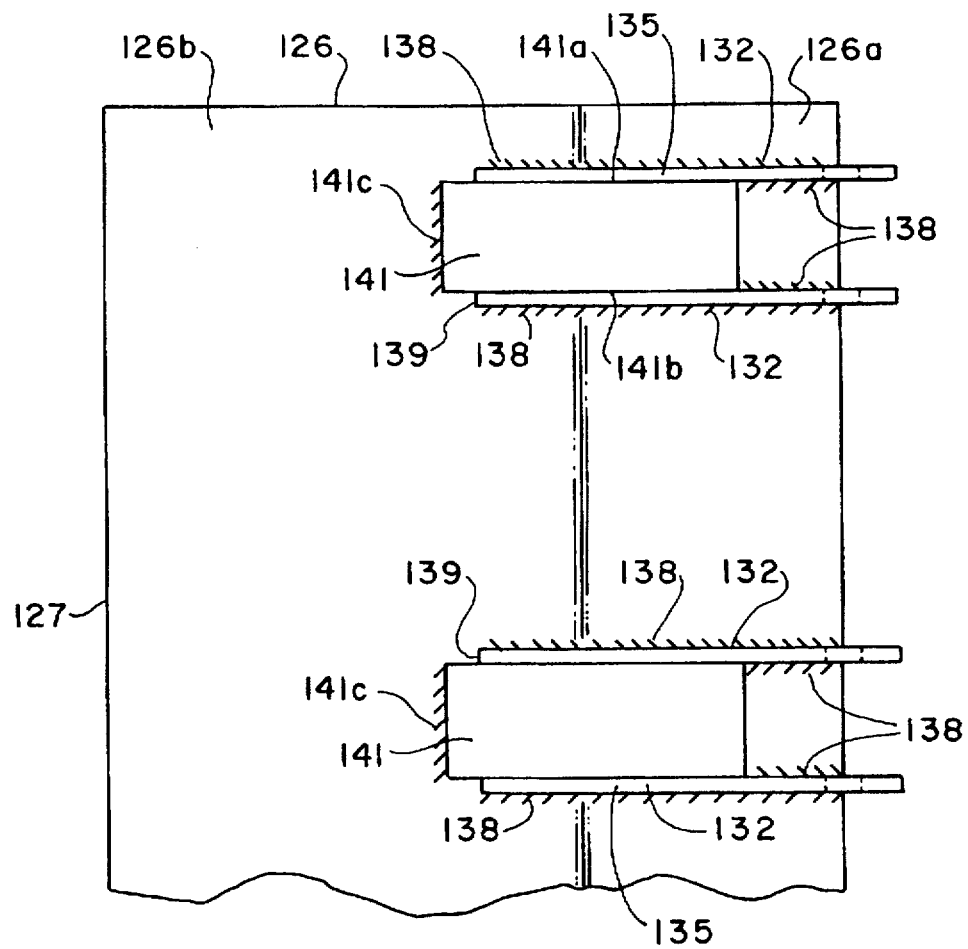
FIG. 10 is a detail bottom plan view of the lip member shown in FIG. 9.

Referring now to FIGS. 9 and 10, there is illustrated an alternate embodiment of a lip member for the dock leveler 10, which lip member is generally designated by the numeral 126. The lip member 126 has a first generally planar portion 126a and a second, generally planar portion 126b defining a forward edge 127. The planar portion 126b is offset from the planar portion 126a at a slight downward angle of about 6°, for example. This offset portion 126b of the lip member 126 is advantageous in certain applications of dock levelers to provide a smoother transition between the load deck or bed of a motor vehicle and the deck of the ramp portion of the dock leveler, particularly when the load deck is above the elevation of the dock.

The lip member 126 is also provided with spaced apart pairs of hinge members 132, see FIG. 10 also, which are suitably secured to the lip member 126 by welds 138, for example. The lip members 132 include hinge pin receiving bores 134 formed in a generally arcuate portion 140 of the hinge members and the hinge members include generally forwardly projecting beam portions 133 which are tapered along opposed edges 135 and 137 toward a distal end 139. The cantilever beam portions 133 of adjacent hinge members 132 of a pair are secured to each other by a generally planar gusset plate 141 which is preferably welded to each of the hinge members 132 with which it is contiguous along its side edges 141a and 141b, see FIG. 10. The gusset plates 141 are also, preferably, welded to the lip member 126 at welds 141c.

The extended cantilever beam portion 133 of each of the hinge members 132 is advantageously provided to strengthen the offset lip member 126, particularly at the juncture between the planar portions 126a and 126b. The beam portion 133 is also tapered to provide adequate clearance between the beam portion and a load deck on which the lip member 126 is to be disposed. The hinge members 132 and gussets 141 may also be modified for use with a flat plate lip member, such as the lip member 26. In any case, the cantilever beam portions 133 add rigidity to the lip member 26 or 126 at a substantial distance from the hinge connection between the lip member and the ramp, such as the ramp 20. The overall length of the cantilever beam portion 133 from the edge 129 of the lip member to the edge 139 of the beam portion may, for example, be at least about 50% of the "length" of the lip member between the edges 127 and 129.

Figure 11:
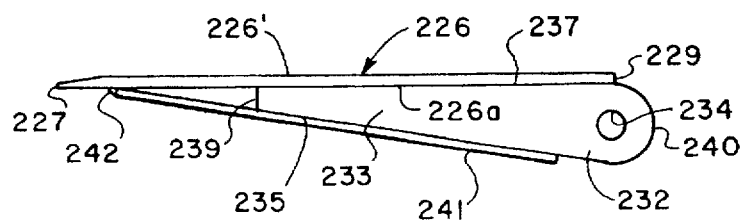
FIG. 11 is a side elevation of another embodiment of a dock leveler lip member.
Figure 12:
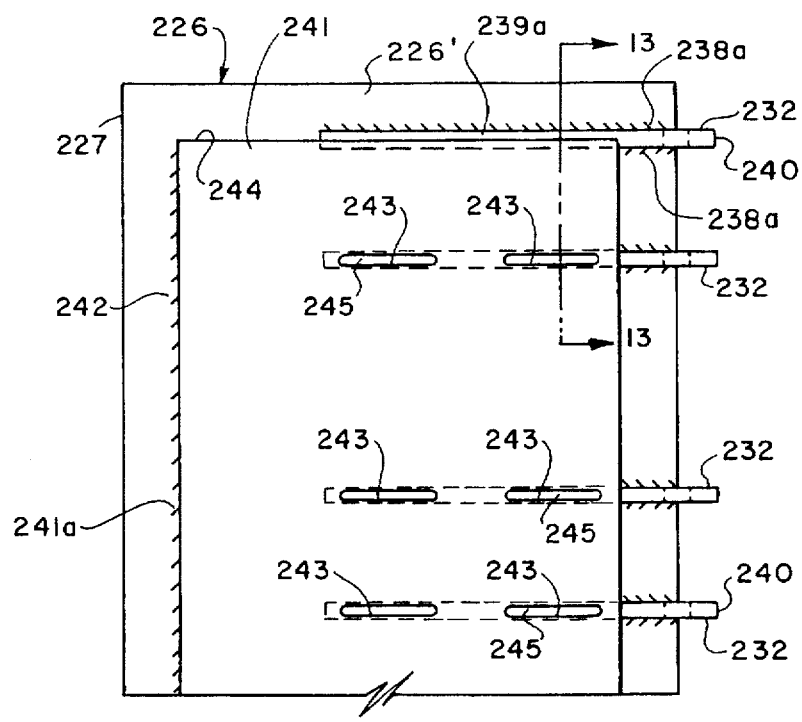
FIG. 12 is a partial bottom plan view of the lip member shown in FIG. 11.

Referring now primarily to FIGS. 11 and 12, another embodiment of a dock leveler ramp lip member in accordance with the invention is illustrated and generally designated by the numeral 226. The lip member 226 includes an elongated, generally rectangular planar lip plate member 226' having a forward distal edge 227 and a rearward edge 229. A plurality of spaced apart hinge members 232 are welded to the underside 226a of plate member 226' and include elongated tapered beam portions 233 extending from an arcuate rearward edge 240 and defined by side edges 235 and 237. Each hinge member 232 includes a bore 234 formed therein for receiving a hinge pin 30. The forward or distal edge 239 of the beam portion 233 may extend more than 50% of the "length" of the plate member 226' between the edges 227 and 229. As shown in FIG. 12, the hinge members 232 are spaced apart in pairs and only two pairs of hinge members 232 are shown in the partial plan view of FIG. 12. Six or more pairs of hinge members may be used in a lip member such as the lip member 226, for example.

The lip member 226 advantageously includes a reinforcing plate 241 contiguous with tapered edge 235 of the beam portion 233 and extending beyond the distal end 239 to a point at which it is contiguous with the plate 226' as defined by a weld 242 extending along the forward edge 241a of the reinforcing member, see FIG. 12. By providing the substantial, generally rectangular planar reinforcing plate member 241, the lip member 226 has a somewhat monocoque type construction and the thickness of the plate members 226' and 241 may be less than the thickness required of a lip member having a single planar plate member such as the lip members 26 or 126, for example. Moreover, the reinforcing plate member 241 is provided with spaced apart slots 243, see FIGS. 12 and 13, which are aligned with the hinge members 232 and overlying the edges 235 of the hinge members in such a way that when the reinforcing plate 241 is placed over the bottom side 226a of the plate member 226' and contiguous with the beam portions 233 of the hinge members 232 the slots 241 are aligned with the edges 235 and the plate member 241 may be welded to respective ones of the hinge members at the slot 243 by welds 245, see FIG. 13, for example. Accordingly, each of the hinge member 232 may be welded to the plate member 241 at welds 245 formed in the slots 243 so that the plate member 241 is suitably secured to the hinge members as well as to the plate member 226' as previously mentioned.

Figure 13:
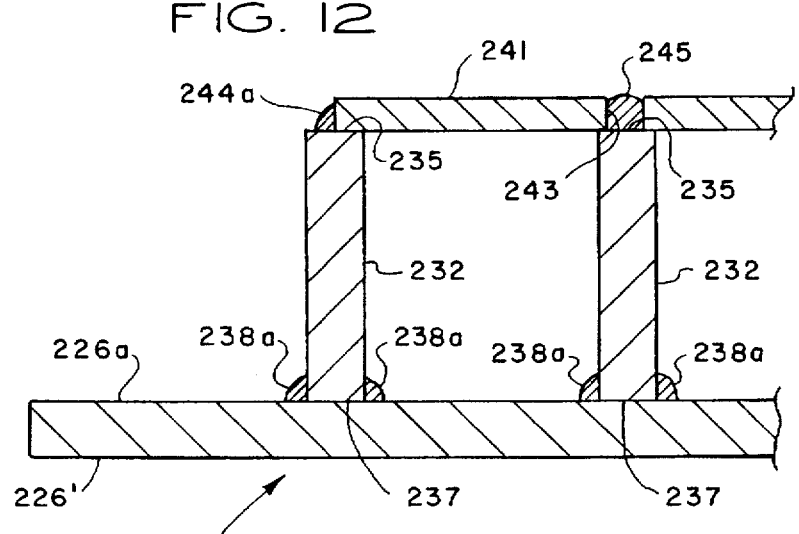
FIG. 13 is a detail section view taken from line 13—13 of FIG. 12.

FIG. 13 also illustrates opposed welds 238a between the hinge members 232 and the plate member 226' and extending along edges 237, and a weld 244a extending along the side edge 244 of plate member 241 which is aligned with an end hinge member 232, as shown in FIGS. 12 and 13.

As previously mentioned, the strength requirements for the lip members 26 and 126, for example, in a typical application of a dock leveler may require a plate thickness of about 0.62 inches or greater, if formed of conventional structural steel. This thickness requires, typically, a thermal cutting type manufacturing operation to form the plate member, which is an expensive and time consuming process. However, with the construction of the lip member 226, the plate member 226' and plate member 241 may be each formed of steel of reduced thickness such as, for example, the plate member 226' may be 0.36 inches thick and the plate member 241 may be 0.25 inches thick. These thicknesses may be mechanically cut, such as by shearing, which is a faster and less expensive manufacturing process. Moreover, the lip member 226 may enjoy an overall greater strength and durability than the lip members 26 or 126.

A dock leveler ramp 20, including a lip member 26, 126 or 226 as described hereinabove, has superior strength, rigidity and durability, thanks to the construction shown and described. The dock leveler 10 and ramp 20 may be constructed of conventional structural steel used for similar apparatus and may be fabricated and assembled, other than as described herein, using conventional manufacturing practices for similar articles.

Although preferred embodiments of the invention have been described in detail hereinabove, those skilled in the art will recognize that various substitutions and modifications may be made to the invention without departing from the scope and spirit of the appended claims.

What is claimed is:

1. In a dock leveler apparatus for forming a pathway between a loading dock and a vehicle for transferring loads therebetween, the improvement comprising:

a dock leveler ramp including means for connecting said ramp to a support structure for pivotal movement between working positions and a storage position, said ramp comprising:

a generally flat deck member;

a plurality of spaced apart beams extending generally parallel to each other and between said means for connecting said ramp to said support structure and a distal end of said ramp, each of said beams including a flange portion connected to said deck member and a web portion extending from said flange portion and away from said deck member; and truss means adjacent said distal end of said ramp for supporting said deck member, said truss means comprising a plurality of struts connected to said deck member and extending between adjacent ones of said beams, respectively, said struts each including opposed distal end portions which are secured, respectively, to a member engaged with one of said beams, respectively, at a point on said one beam spaced from said deck member to minimize deflection of said deck member.

2. The invention set forth in claim 1 including:

an elongated truss member extending between and connected to said beams and adjacent to said struts.

3. The invention set forth in claim 1 wherein:

said struts comprise generally inverted V-shaped members having a base portion engaged with said deck member and opposed depending leg portions extending from said base portion and toward adjacent ones of said beams, respectively.

4. The invention set forth in claim 1 including:

a plurality of spaced apart hinge members disposed on opposite sides of said beams, respectively, at said distal end of said ramp and secured to at least one of said deck member and said beams, respectively.

5. The invention set forth in claim 4 wherein:

said hinge members are provided in spaced apart pairs, each of said hinge members including means for supporting a hinge pin for connecting a lip member to said ramp.

6. The invention set forth in claim 5 wherein:

said struts are disposed between adjacent ones of said hinge members of adjacent pairs of said hinge members and are secured to said adjacent ones of said hinge members, respectively.

7. The invention set forth in claim 4 including:

a lip member comprising a generally elongated plate having a first side edge and spaced apart pairs of hinge members secured to said lip member adjacent said first side edge and positioned on said lip member to provide for connecting said lip member to said ramp by an elongated hinge pin extending between said hinge members of said lip member and said hinge members of said ramp.

8. The invention set forth in claim 7 wherein:

said hinge members each include an elongated beam portion welded to said lip member, respectively.

9. The invention set forth in claim 8 wherein:

said beam portion is tapered from a part of said hinge member including a bore for receiving said hinge pin to a distal end of said hinge member extending toward a second edge of said lip member spaced from said first edge.

10. The invention set forth in claim 7 including:

gusset members interposed between and connected to each of said hinge members of said pairs for reinforcing said hinge members and said lip member.

11. The invention set forth in claim 7 wherein:

said lip member includes two planar portions which are offset relative to each other to form a sloped surface of said lip member.

12. The invention set forth in claim 7 wherein:

said lip member comprises a second, generally elongated plate secured to said hinge members, respectively, along side edges of said hinge members opposite side edges of said hinge members which are secured to said first mentioned plate.

13. The invention set forth in claim 1 including:

a support member extending between said beams adjacent an end of said ramp opposite said distal end and secured to at least one of said deck member and said beams, respectively.

14. The invention set forth in claim 13 including:

a gusset extending between said support member and said deck member and secured to said support member and said deck member, respectively.

15. The invention set forth in claim 14 including:

a pivot rod secured to said deck member between said gusset and a side edge of said deck member.

16. The invention set forth in claim 1 wherein:

said beams comprise elongated channel cross section members having spaced apart, generally parallel flanges and an interconnecting web and said beams are secured to said deck member along one of said flanges, respectively.

17. In a dock leveler apparatus for disposition at a loading dock to form a load supporting pathway between said loading dock and a vehicle loadbed, a ramp adapted to be pivotally connected to support means at said dock, said ramp comprising:

a generally flat, rectangular planar deck member;

a plurality of spaced apart elongated beams extending between first and second spaced apart side edges of said deck member, respectively, said beams each including a flange portion engaged with said deck member and a web portion extending from said flange portion away from said deck member; and a truss adjacent one of said side edges of said deck member comprising a plurality of spaced apart struts extending between adjacent ones of said beams, respectively, said struts each being engaged with and secured to said deck member and each including opposed distal end portions which are secured, respectively, to a member engaged with one of said beams, respectively, at a point on said one beam spaced from said deck member, and an elongated truss member extending between and engaged with respective ones of said beams and disposed adjacent to said struts, respectively.

18. The invention set forth in claim 17 wherein:

said struts comprise generally V-shaped members having a base portion contiguous with said deck member and opposed leg portions extending from said base portion and toward adjacent ones of said beams, respectively.

19. The invention set forth in claim 17 including:

a plurality of spaced apart hinge members disposed on opposite sides of said beams, respectively, at said one side edge of said deck member and secured to at least one of said deck member and said beams, respectively.

20. The invention set forth in claim 19 wherein:

said hinge members each include a first longitudinal side edge contiguous with said deck member and welded to said deck member, said first longitudinal side edge being greater in length than a second longitudinal side edge generally parallel to said first longitudinal side edge.

21. The invention set forth in claim 19 including:

a lip member comprising a generally elongated flat plate having a first side edge and spaced apart pairs of hinge members secured to said lip member adjacent said first side edge and positioned on said lip member to provide for connecting said lip member to said ramp by an elongated hinge pin extending between said hinge members of said lip member and said hinge members of said ramp.

22. The invention set forth in claim 17 wherein:

said beams comprise elongated channel cross section members having spaced apart, generally parallel flanges and an interconnecting web and said beams are secured to said deck member along one of said flanges, respectively.

23. A method for manufacturing a dock leveler ramp comprising a generally flat plate deck member supported for pivotal movement with respect to a loading dock and having a distal side edge adapted to project toward a loadbed of a vehicle, comprising the steps of:

welding a plurality of elongated beams to an underside of said deck member, spaced apart on said deck member and extending between said distal side edge and an opposite side edge of said deck member;

welding a plurality of hinge members to respective ones of said beams at ends of said beams adjacent said distal side edge of said deck member, said hinge members including means for supporting a hinge pin;

placing respective plural strut members in positions extending between adjacent ones of said beams, respectively, and welding each of said strut members to said deck member and to adjacent ones of said hinge members at points spaced from said deck member, respectively.

24. The method set forth in claim 23 including the step of:

placing an elongated truss member over said strut members, respectively and welding said truss member to at least one of said beams, said hinge members and said strut members.

25. The method set forth in claim 23 including the step of:

welding an elongated support plate to said beams and said deck member at opposite ends of said beams, respectively.

26. The method set forth in claim 25 including the step of:

welding a gusset to said support plate and said deck member along adjacent side edges of said gusset, respectively.

27. The method set forth in claim 26 including the step of:

welding a hinge rod to said deck member between said gusset and said opposite side edge of said deck member.

28. In a dock leveler ramp having a generally flat deck member and hinge means for connecting said ramp to an extension lip, an improved lip member comprising said extension lip and characterized by:

a first generally elongated plate member having a forward distal edge;

a plurality of hinge members disposed spaced apart from each other along an edge opposite said forward distal edge of said first plate member, said hinge members each including elongated beam portions formed thereon extending toward said distal edge of said first plate member, respectively, and a bore for receiving a hinge pin, said beam portions being secured to said plate member by welding along contiguous edges of said hinge members with said first plate member, respectively; and an elongated, generally flat reinforcing plate overlying said first plate member and contiguous with said beam portions of said hinge members, respectively, and secured to said beam portions to form a substantially rigid lip member.

29. The invention set forth in claim 28 wherein:

said reinforcing plate includes a plurality of slots formed therein and positioned to overlie side edges of said beam portions of said hinge members, respectively, for welding said reinforcing plate to said hinge members, respectively, at said slots.

30. The invention set forth in claim 28 wherein:

said reinforcing plate is welded to said first plate member along a forward distal side edge of said reinforcing plate.

\* \* \* \* \*